United States Patent [19]

Voss

[11] 3,907,863

[45] Sept. 23, 1975

[54] PROCESS FOR MAKING POLYESTER POLYOLS HAVING A LOW ACID NUMBER

[75] Inventor: Harro Voss, Ludwigshafen, Germany

[73] Assignee: BASF Wyandotte Corporation, Wyandotte, Mich.

[22] Filed: Mar. 14, 1974

[21] Appl. No.: 450,986

[30] Foreign Application Priority Data

Mar. 31, 1973 Germany............................ 2316293

[52] U.S. Cl.............. 260/468 K; 260/75 T; 260/77; 260/475 P; 260/479 S; 260/485 G
[51] Int. Cl.²....................C07C 69/44; C07C 69/74; C07C 69/80
[58] Field of Search .... 260/475 P, 77, 75 T, 485 G, 260/468 K, 479 S

[56] References Cited
UNITED STATES PATENTS

| | | | |
|---|---|---|---|
| 2,418,633 | 4/1947 | Gould | 260/77 |
| 3,086,044 | 4/1963 | Kerschner et al. | 260/475 P |
| 3,247,115 | 4/1966 | Kluge et al. | 260/77 |

*Primary Examiner*—Robert Gerstl
*Assistant Examiner*—E. Jane Skelly
*Attorney, Agent, or Firm*—Bernhard R. Swick; Joseph D. Michaels; Robert E. Dunn

[57] ABSTRACT

Catalyst free polyester polyols for use in polyurethane compositions are prepared by melt-condensation of polyalcohols and polycarboxylic acids. When the resulting polyol obtains an acid number of 480 or less, selected distillable mono- and/or dialcohols are added and the condensation continued until an acid number of less than one is obtained. By the same process out of specification polyester polyols can be regenerated for polyurethane use.

10 Claims, No Drawings

PROCESS FOR MAKING POLYESTER POLYOLS HAVING A LOW ACID NUMBER

BACKGROUND

1. Field of the Invention

This invention relates to the preparation of catalyst free polyester polyols having an acid number of less than one which are suitable for polyurethane applications.

2. Description of the Prior Art

The preparation of polyesters as such is known. Conventionally, these products are prepared by melt-condensation from polyalcohols and polycarboxylic acids in the presence of acids of metal salts thereof as catalysts. Suitably, the condensation is carried out under reduced pressure, in order to remove the water produced by the condensation by distillation and also to displace the equilibrium of the reaction in the direction of polyester formation. A disadvantageous feature of this approach is that under these reaction conditions the starting materials, especially the polyols, will in part also distill off, or sublime, and therefore the resulting polyesters do not reach the desired molecular weights, and also have acid numbers higher than desired.

For many application uses, for example, for the preparation of polyurethanes, it is a necessity that the polyester polyols not only have uniform molecular weights, but also that they have low acid numbers. For the manufacture of polyester polyols with acid numbers less than 2, especially less than one, very long reaction times and very high reaction temperatures are required. Furthermore, it is detrimental if the resulting products are of dark brown to black color (because of decomposition reactions) or exhibit varying reaction times when reacted with an isocyanate. In order to remove these disadvantages, the proposal has been made to carry out the condensation reaction in the presence of metal catalysts, e.g., in the presence of iron, cadmium, cobalt, lead, zinc, antimony, magnesium, titanium, or tin, which may be present as the metal per se, the metal oxide, or as metal salt. However, such compounds not only catalize the polyester formation, but also catalize the hydrolytic decomposition of the polycondensation products in the presence of moisture in the air. It is furthermore detrimental, that the active catalyst residues contained in the polyester polyols can interfere in polyurethane preparation by (1) means of promoting such side-reactions as allophanate or biuret formation, (2) promoting the trimerization or polymerization of isocyanate and/or (3) providing either an additional catalytic effect, or a retardation of the polyaddition reaction as such. It has also been proposed to prepare unsaturated polyesters from alpha, beta unsaturated dicarboxylic acid anhydrides, and about equimolar glycol quantities, in the presence of low boiling non-functional alcohols. The disadvantageous feature in this case is the fact that the resulting products have acid numbers which are greater than 17.

SUMMARY OF THE INVENTION

In accordance with this invention there is provided a process for the preparation of polyester polyols wherein residual active catalyst is undesirable by the esterification of a polyhydric alcohol and polycarboxylic acid at a temperature from about 150° to about 300°C, the improvement which comprises continuing the esterification until the product has an acid number of 480 or less and then adding to the esterification mixture a distillable alcohol in an amount of 0.1 to 1.4 moles per mole of polycarboxylic acid charged and continuing said reaction while simultaneously distilling off the excess distillable alcohol until the esterification is completed, said distillable alcohol being selected from the group consisting of aliphatic monohydroxy alcohols containing from 1 to 6 carbon atoms, aromatic monohydroxy alcohols, aliphatic dihydroxy alcohols containing from 2 to 8 carbon atoms, dialkyl ether glycols containing from 2 to 8 carbon atoms in each alkyl group, and mixtures thereof. Previously prepared polyester polyols which are unsuitable for use in polyurethane compositions can be regenerated and made suitable by treating or processing in the same abovedescribed process.

DESCRIPTION OF THE PREFERRED EMBODIMENTS

Surprisingly, it has been found that polyester polyols can be prepared with acid numbers less than one, by a melt-condensation process, using polycarboxylic acids and polyalcohols, at temperatures of from 150°–300°C, if distillable dialcohols are added to an esterification mixture which has acid numbers of less than 480. Mixtures of di- and monoalcohols can also be used for such esterification mixtures. When the acid number is less than 60 before the distillable alcohol is added, then monohydroxy alcohols alone are added and the condensation reaction is brought to completion while simultaneously distilling off the excess alcohol.

The distillable alcohol is added to the meltcondensation esterification mixture in an amount of from 0.1 to 1.4 moles and preferably 0.3 to 1.2 moles of distillable alcohol for each mole of polycarboxylic acid.

The mono- and/or preferable dialcohols, useful in the process of this invention, are of the type which is easily distillable from the reaction mixture under normal, or as the case may be, reduced pressure. As monoalcohols, aromatic or preferably aliphatic alcohols, with from 1–6, preferably 1–3 carbon atoms are to be considered. For example, n-hexanol, n- and tert.-butanol, and phenol can be listed. Methanol, ethanol, propanol, and isopropanol are especially suited. These monoalcohols, under certain circumstances may also be used in their technical grades, for instance, as products with a water content of about 4 percent by weight.

The preferred dialcohols, which are partly also condensed into the polyester polyol as an additional component, are those with from 2–8, preferably 2–6, carbon atoms in the alkyl radical; also diglycol ethers are compounds to be considered. Specific examples are, for instance: neopentyl glycol, 1,8-octane diol, 1,6-hexane diol, diproplyene glycol, 1,2- and 1,4-butene diol. Those preferably used are: ethylene glycol, 1,2- and 1,3-propylene glycol, 1,3- and 1,4-butane diol, and diethylene glycol.

For the polyester polyol preparation the conventional polycarboxylic acids and polyalcohols, described in many publications, are used. Suitable are, for instance, the aromatic carboxylic acids, or their derivatives, such as phthalic acid, phthalic acid anhydride, and terephthalic acid, cycloaliphatic carboxylic acids, such as cyclohexane dicarboxylic acid, and preferably aliphatic diacarboxylic acids with from 2–16, preferably 2–10, carbon atoms in the alkyl radical, e.g., sebacic acid, dodecane dicarboxylic acid, thapsic acid, glutaric acid, pimelic acid, suberic acid, and preferably adipic acid and succinic acid. For some application areas, it is expedient to modify the polyester polyols with tri- or tetracarboxylic acids, such as trimetallic acid, or also with olefinically unsaturated dicarboxylic acids, for example, maleic acid or fumaric acid. The acids listed may be used individually or in combination with each other.

The polyols under consideration are, for example, polyether and/or polyester diols with molecular weights up to about 4500, preferably with molecular weight from 200–2200. The polyether diols are suitably prepared by polymerizing alkylene oxides or, as the case may be, branched alkylene oxides with from 2–4 carbon atoms in the alkyl radical, for instance, ethylene oxide, 1,2-propylene oxide, butylene oxide, and tetrahydrofurane, said polymerization being carried out in the presence of such initiator molecules as water and dialcohols and in the presence of catalysts. Preferably, however, such straight chain or substituted, or unsaturated aliphatic diols, i.e., normal, cyclo and branched alkyl, aklene and alkines, which contain from 2–18, preferably 2–12, carbon atoms are used as the polyol component. The following are specific examples: 1,2-butene diol, 1,4-butyne diol-2, decane diol, neopentyl glycol, 1,2- and 1,3-propane diol, diethylene glycol, 1,3-butylene glycol, 2,2,4-trimethyl hexane diol, and preferably ethylene glycol, 1,4-butane diol and 1,6-hexane diol. To prepare branched polyester polyols expediently such polyalcohols as glycerine, trimethylol ethane and trimethylol propane, pentaerythritol, etc., can be jointly employed. Additionally, in the preparation of mixed polyester polyols mixtures of various polycarboxylic acids and polyalcohols can be used.

To prepare polyester polyols with acid numbers less than 1, preferably less than 0.8, the polycarboxylic acid and the polyol are condensed with each other in the absence of any catalyst, suitably in an atmosphere of inert gases, such as nitrogen, helium, argon or others, using mole ratios of 1:1: to 1:1.4, preferably 1:1.05 to 1:1.2, at temperatures of from 150°–300°C, preferably 180°–220°C under normal pressure conditionss or, as the case may be, under reduced pressure conditions. An unesterified mixture of adipic acid and ethylene glycol which results in a polyester polyol of 10,000 molecular weight, for instance, will have an acid number of 535 mg KOH/g. If the polyester mixture exhibits an acid number of less than 480, preferably less than 270, a "distillable" dialcohol, or a mixture of di- and mono-alcohol, is added to the reaction mixture. Correspondingly, to a polyester mix with an acid number of less than 60, preferably less than 25, the monoalcohol is added. The distillable di- or monoalcohols are added to the condensation mixture in additional amounts of from 0.1–1.4, preferably 0.3–1.2 moles per mole polycarboxylic acid. Subsequently, the condensation reaction is brought to its conclusion, under inert gas blanket conditions, at temperatures between 150° – 250°C, preferably 160° –220°C, while distilling off the excess alcohol, under normal or reduced pressure conditions, over a period of from 0.5–40, preferably 4–24 hours.

The polyester polyols, prepared according to the procedure of this invention, have molecular weights of from about 300 to about 10,000, perferably from about 800 to about 4500, have acid numbers of less than 1, preferably less than 0.8, and have hydroxyl numbers of from 10–400, depending on the magnitude of the molecular weight.

The products, which are free of catalyst residues, are nearly colorless, very stable to hydrolysis and storage, and are characterized by uniform reactivity versus isocyanates over a long time period. The products are excellently suited for the preparation of polyurethanes, especially for the manufacture of polyurethane based foams, adhesives, elastomers, and coatings.

With the aid of the manufacturing procedure according to this invention, it is possible, for example, to regenerate polyester polyols, which have been partially hydrolized through improper storage and are, therefore, no longer suitable for the manufacture of polyurethanes. In this context it is essential that the off-specification polyester polyols are only reactivated with respect to acid number, water content, and the varying reaction times with isocyanates, while other characteristics, such as hydroxyl number, viscosity, and the iodine color number, remain practically unchanged.

The polyester polyols described above, as well as those in the examples below otherwise noted, are prepared in a conventional esterification setup and need no further description to those skilled in the art, however, by way of further elucidation and yet with brevity reference is made to the monograph "Methods of Organic Chemistry" (Houben-Weyl), Vol. XIV/2, Macromolecular Materials, part 2, page 16 (Georg Thieme Publishing House, Stuttgart, 1963) which is hereby incorporated herein by reference.

The following examples are included to illustrate the process of the present invention and the products prepared thereby but are not to be considered limiting.

EXAMPLE 1

Using the procedure of the above-cited monograph, into a three-necked flask of 2000 ml volume, 292 g (2 moles) of adipic acid are charged and made free of oxygen by evacuating 3 times to a pressure of 2 mm of mercury and relieving the vacuum with nitrogen. While stirring under a nitrogen blanket, 204 g (2.27 moles) of 1,4-butane diol are added and the reaction mixture condensed for 6 hours at 210°C. To the esterification mixture, which had an acid number of 23, 400 g of methanol (11.8 moles) are added over a period of 35 minutes, during which time the largest part of the added methanol immediately distills off again. Subsequent to this, the condensation is brought to conclusion at 210°C, over 16 hours, while simultaneously the excess methanol is distilled off.

The hydroxyl group containing adipic acid/1,4-butane diol polyester has a molecular weight of about 2000, a hydroxyl number of 51, a water content of 0.04 percent by weight, and an acid number of 0.63.

EXAMPLE 2

In a three-necked flask of 2000 ml volume, 292 g (2 moles) of adipic acid, freed of oxygen by evacuating three times to 2 mm of mercury and relieving the vacuum with Argon, were mixed with 138 g (2.23 moles) of ethylene glycol and reacted for 3.5 hours with stirring, under an Argon atmosphere at 200°C. To the esterification mixture, which had an acid number of 60, 80 g (2.5 moles) of methanol were added over a period of 5 minutes during which time the largest part of the methanol is immediately distilled off again and the mixture continued to be reacted for 3.5 hours. Subsequently, an additional 80 g (2.5 moles) methanol are added over a period of 5 minutes, with the reaction mixture at an acid number of 16.5; again the reaction is continued, while simultaneously distilling off the excess methanol over a period of 21 hours at 200°C.

The resulting hydroxyl group containing adipic acid-/ethylene glycol polyester has a molecular weight of about 2000, a hydroxyl number of 57, a water content of 0.04% by weight, and an acid number of 0.65.

EXAMPLE 3

A mixture consisting of 292 g (2 moles) adipic acid and 138 g (2.23 moles) ethylene glycol was reacted, in line with the details described in Example 1, for 1.5 hours at 210°C. To the esterification mixture, which has an acid number of 111, then 124 g (2 moles) ethylene glycol are added and the mixture is further reacted at 230°C for 2 hours while distilling off excess ethylene glycol. Subsequently, the reaction is continued under reduced pressure, while simultaneously distilling off the residual excess glycol, and is brought to conclusion over a period of 9 hours; during this reaction phase, the pressure was reduced to 10 mm of mercury within 30 minutes, and the temperature was lowered to 220°C. The resulting polyester polyol has a molecular weight of about 2000, a hydroxyl number of 59, a water content of 0.08, and an acid number of 0.45.

EXAMPLE 4

A mixture consisting of 2482 g (17 moles) adipic acid, 1442 g (12.2 moles) 1,6-hexane diol; and 709 g (6.8 moles) neopentyl glycol was reacted in a three-necked flast of 6000 ml volume, analogous to the details given in Example 1, at 210°C for 4.75 hours. Then the reaction is continued under reduced pressure, the pressure being reduced to 10 mm of mercury over a period of 3.75 hours. After relieving the vacuum in the system with Argon, 621 g (10 moles) of ethylene glycol were added to the esterification mixture, which had an acid number of 8.7. The condensation reaction was then brought to conclusion under reduced pressure, and while distilling off the excess ethylene glycol, over a period of 14 hours, with the pressure being reduced to 10 mm of mercury over a period of 4 hours. The resulting polyester polyol has a molecular weight of about 2000, a hydroxyl number of 56, a water content of 0.06 percent by weight, and an acid number of 0.31.

EXAMPLE 5

A mixture consisting of 2923 g (20 moles) adipic acid, 1001 g (16.04 moles) ethylene glycol, and 472 g (5.36 moles) of vinyl glycol was reacted in a 6000 ml three-necked flask, according to the details of Example 1, for 1.5 hours at 170°C. To the esterification mixture, which had an acid number of 226, then 995 g (16 moles) of ethylene glycol were added and the reaction is continued for 2 hours at 210°C. The condensation reaction is then brought to its conclusion over a period of 7 hours, and under reduced pressure, and while simultaneously distilling off the excess diol; the pressure was reduced to 7 mm of mercury over a period of 4.5 hours. The resulting polyester polyol has a molecular weight of about 1700, a hydroxyl number of 65, a water content of 0.02 percent by weight, an iodine number of 22 g $I_2$/100 g, and an acid number of 0.62.

EXAMPLE 6

A mixture consisting of 2923 g (20 moles) adipic acid, 946 g (11 moles) 1,4-butynediol-1, and 678 g (10.9 moles) of ethylene glycol were reacted according to Example 5 for 1.5 hours at 170°C. To the esterification mixture, which had an acid number of 176, 1240 g (20 moles) of ethylene glycol were then added and the reaction continued for 2 hours at 210°C. Subsequently, the reaction was continued under reduced pressure for 12 hours, while distilling off the excess alcohol. The pressure was reduced to 10 mm of mercury within 3 hours. The polyester polyol had a molecular weight of about 1800, a hydroxyl number of 63, a water content of 0.03% by weight, and an iodine number of 126 g $I_2$/100 g, and an acid number of 0.66.

EXAMPLE 7

A mixture of 2923 g (20 moles) adipic acid, 1240 g (20 moles) of ethylene glycol, and 887 g (2.162 moles) of a propylene glycol with a molecular weight of 410, is reacted in line with the details provided in Example 1, in a 6000 ml three-necked flask, reaction temperature being 170°C, and reaction time 1.5 hours. To the esterification mixture, which had an acid number of 159, 1240 g (20 moles) of ethylene glycol were then added, and the condensation reaction continued for 2 hours at 210°C. Subsequently, the reaction is brought to its conclusion under reduced pressure over a period of 11 hours, while simultaneously distilling off the excess ethylene glycol; the pressure was reduced to 10 mm of mercury within a period of 3 hours. The polyester polyol produced has a molecular weight of about 2000, a hydroxyl number of 52, a water content of 0.09 percent by weight, and an acid number of 0.54.

EXAMPLE 8

A mixture consisting of 1410 g (10 moles) adipic acid, 621 g (10 moles) ethylene glycol, and 1753 g. (1.736 moles) of a polypropylene glycol of molecular weight 1010, was reacted in a three-necked flask of 6000 ml volume analogous to the procedure described in Example 7. To the esterification mixture, which had an acid number of 107, 1240 g (20 moles) of ethylene glycol were added, and the condensation reaction was continued for 3 hours at 210°C. Subsequently, the reaction is brought to its conclusion under reduced pressure, and while distilling off the excess ethylene glycol over a period of 18 hours; the pressure was reduced to 8 mm of mercury within a period of 5 hours. The resulting polyester polyol had a molecular weight of about 3000, a hydroxyl number of 38, a water content of 0.12 percent by weight, and an acid number of 0.68.

EXAMPLE 9

A mixture consisting of 2923 g (20 moles) adipic acid, 1240 g (20 moles) ethylene glycol, and 301 g (1.87 moles) N-(n-butyl)-diethanolamine was reacted by the procedure described in Example 1 in a 6000 ml three-necked flast. To the esterification mixture, which had an acid number of 100, 1240 g (20 moles) of ethylene glycol were added and the condensation reaction continued for 2 hours at 210°C. Subsequently, the condensation reaction was brought to completion under reduced pressure, while simultaneously distilling off the excess ethylene glycol, over a period of 12 hours; the pressure was reduced to 10 mm mercury within a period of 8 hours. The resulting polyester polyol had a molecular weight of about 1800, a hydroxyl number of 63, a water content of 0.08 percent by weight, and an acid number of 0.80.

EXAMPLE 10

A mixture consisting of 1200 g (8.23 moles) adipic acid, 173 g (0.8 moles) N,N-bis-(hydroxyethyl)-N-propane sulfonic acid sodium salt, and 514 g (8.23 moles) ethylene glycol, was reacted according to the procedure described in Example 1, in a three-necked flask of 4000 ml volume, the reaction period was 1.5 hours, the reaction temperature 170°C. To the esterification mixture, which had an acid number of 90, 620 g (10 moles) of ethylene glycol were added and the reaction was brought to its conclusion under reduced pressure and while simultaneously distilling off the excess ethylene glycol over a period of 8 hours; the pressure having been reduced to 10 mm of mercury within 3 hours. The resulting polyester polyol had a molecular weight of about 2500, a hydroxyl number of 44, a water content of 0.12 percent by weight, and an acid number of 0.26.

EXAMPLE 11

A mixture consisting of 3500 g of a polyester polyol with a molecular weight of about 2000, with the polyester polyol having been degraded by prolonged storage and being characterized by a hydroxyl number of 56, a water content of 0.51 percent by weight, an acid number of 0.89, and a reaction time versus isocyanates of 281 seconds at 100°C, and 1240 g (20 moles) of ethylene glycol is reacted in a 6000 ml three-necked flask, under nitrogen, for 1.45 hours at 210°C. Subsequently, the excess ethylene glycol is distilled off under reduced pressure over a period of 6 hours; the pressure having been reduced to 6 mm of mercury with 4 hours. The reactived polyester polyol was found to have a hydroxyl number of 54, a water content of less than 0.01 percent by weight, an acid number of 0.45, and a reaction time versus isocyanates of 35 seconds at 100°C.

EXAMPLE 12

A mixture of 124 g (2 moles) ethylene glycol, and 3500 g of a polyester polyol, which had been prepared catalyst free from adipic acid and ethylene glycol, and which is characterized by a hydroxyl number of 56, a water content of 0.06 percent by weight, an acid number of 0.41, and has an isocyanate reaction time of 199 seconds at 100°C, was heated with stirring in an Argon atmosphere in a 6000 ml three-necked flask to 210°C. Subsequently, the excess ethylene glycol is distilled off under reduced pressure at 210°C over a period of 4 hours, the pressure being reduced to 8 mm of mercury within 2 hours. The polyester polyol now had a hydroxyl number of 50, an acid number of 0.50, a water content of 0.04 percent by weight, and an isocyanate reaction time of 68 seconds at 100°C.

COMPARATIVE EXAMPLES

EXAMPLE A 292 g (2 moles) of adipic acid are processed to a polyester with 226 g (2.52 moles) of 1,4-butane diol, analogous to the details described in Example 1, but without the addition of methanol. After a reaction period of 46 hours at 210°C, the polyester polyol had a molecular weight of about 2000, a hydroxyl number of 52, a water content of 0.12 percent by weight and an acid number of 1.51.

EXAMPLE B

A mixture consisting of 292 g (2 moles) adipic acid and 203 g (2.25 moles) 1,4-butane diol was reacted for 6.5 hours at 210°C in accordance with the details described in Example 1. Subsequently, the reaction was continued under reduced pressure, the pressure being reduced to 40 mm of mercury over a period of 2 hours. The resulting polyester polyol, after a reaction period of 56 hours, had an acid number of 1.46, after 72 hours reaction time an acid number of 1.46, and after 80 hours of reaction time a molecular weight of about 2700, a hydroxyl number of 42, a water content of 0.03 percent by weight, and an acid number of 1.54.

Examples 1 through 10 above illustrate the advantages of the present invention in preparing polyester polyols. Additionally, as shown by Examples 11 and 12, the invented process is also useful in reconditioning polyester polyols which have become unsatisfactory for use in polyurethane compositions because of change of properties upon storage, etc. By way of contrast when following the procedures, etc., of Example 1 but without the improvement of this invention, Examples A and B clearly show the beneficial results of Example 1 cannot be obtained.

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. In a process for the preparation of polyester polyols by the melt-condensation esterification of a polyhydric alchol selected from the group consisting of polyether diols and polyester diols and a polycarboxylic acid at a temperature from about 150° to about 300°C wherein residual amounts of active catalyst is undesirable, the improvement for producing such polyols having an acid number less than one which comprises:

continuing the esterification until the product has an acid number of 480 or less and then adding to the esterification mixture of reactants and product a distillable alcohol in an amount of 0.1 to 1.4 moles per mole of carboxylic acid charged and continuing the esterification while simultaneously distilling off the excess distillable alcohol until the esterification is completed, said distillable alcohol being selected from the group consisting of (a) monohydroxy normal, branched or cyclo alkyl, alkene or alkine alcohols containing from 1 to 6 carbon atoms, (b) aromatic monohydroxy alcohols, (c) dihydroxy normal, branched or cyclo alkyl, alkene or alkine alcohols containing from 2 to 8 carbon atoms, dialkyl ether glycols containing from 2 to 8 carbon atoms in each alkyl group and mixtures thereof, said polyether and polyester diols having a molecular weight from 200 to 4500, said distillable alcohol being said monohydroxy alcohols when said acid number is less than 60 prior to said distillable alcohol addition and dialcohols or mixtures of di- and monoalcohols when said acid number is greater than 60.

2. The process of claim 1 wherein the polyhydric alcohol is a poly(alkylether) diol wherein each alkyl group contains from 2 to 4 carbon atoms and a molecular weight up to about 4500.

3. The process of claim 1 wherein the acid number is 270 or less and the distillable alcohol is a dihydroxy alcohol.

4. The process of claim 1 wherein the acid number is 270 or less and the distillable alcohol is a mixture of mono- and dihydroxy alcohols.

5. The process according to claim 1 wherein the acid number is 60 or less and the distillable alcohol is a monohydroxy alcohol.

6. The process according to claim 5 wherein the acid number is 25 or less.

7. The process according to claim 1 wherein the esterification is continued after the addition of distillable alcohol at a temperature from 150° to 250°C.

8. The process according to claim 7 wherein the temperature is from 160° to 220°C.

9. The process according to claim 1 wherein the amount of distillable alcohol added is 0.3 to 1.2 moles.

10. A process for the regeneration of partially hydrolized polyester polyols which have an acid number of less than 60 are no longer suitable for use in polyurethane formulations by using said hydrolized polyester polyol as the esterification mixture in the process of claim 1.

* * * * *